United States Patent Office 3,462,412
Patented Aug. 19, 1969

3,462,412
PROCESS OF PRODUCING AN ACTIVE SUBSTANCE FOR STIMULATING THE FUNCTION OF THE RETICULO-ENDOTHELIAL SYSTEM
Hirosuke Yamada, Kyoji Shishido, Takao Hoshino, Seizaburo Kobayashi, and Isami Sato, Fukushima, Japan, assignors to Tohoku Yakult Seizo Kabushiki Kaisha, Tokyo, Japan
Filed Mar. 28, 1967, Ser. No. 626,623
Claims priority, application Japan, Apr. 20, 1966, 41/24,616
Int. Cl. A61k 25/00
U.S. Cl. 260—209          3 Claims

ABSTRACT OF THE DISCLOSURE

This invention relates to a process of producing an active substance for stimulating the function of the reticulo-endothelial system from an unicellular green alga such as "Chlorella" or "Scenedesmus" by successively extracting the green alga with a hydrophilic organic solvent or a mixture of the hydrophilic organic solvent and water, and water, an alkaline aqueous solution and an acidic aqueous solution to produce an extract respectively, removing the organic solvent, an alkali substance or an acidic substance from each of the extracts, forming a precipitate of impurities by adding an organic solvent such as ethanol into said extracts, removing said impurities from said extract, forming a white precipitate by adding ethanol into each of said extracts respectively, and recovering said white precipitate from each of the extracts. The white precipitate finally obtained from each of the extracts may be purified respectively or after combining them.

---

Figure 1:
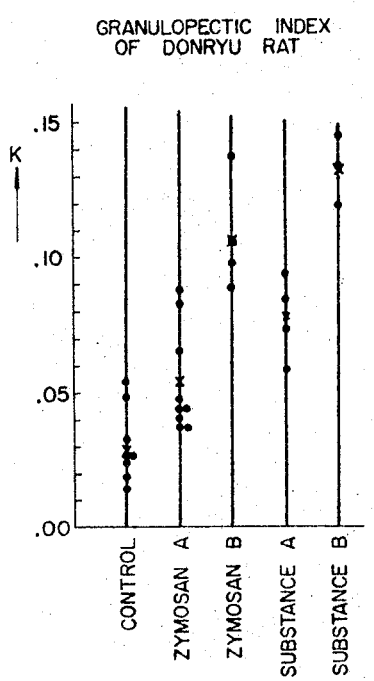

This invention relates to a process of producing an active substance for stimulating the function of the reticulo-endothelial system from an unicellular green alga such as "Chlorella" or "Scenedesmus" by successively extracting the green alga with a hydrophilic organic solvent, water, an alkaline aqueous solution and an acidic aqueous solution.

The general term "reticulo-endothelial system" refers to certain vascular cells such as cells existing in the liver, bone-marrow, spleen, adrenal gland and hypophysis or macrophage existing in the connective tissue, and single cells existing in the blood or the like but the term particularly refers to the vascular cells as the endothelia of said internal organs degenerated due to phagocytosis. The characteristic function of the reticulo-endothelial system is also closely related to the elimination of foreign bodies, formation of antibodies and increase of the non-specific resistance of the host against infection.

Recently, some substance for stimulating the function of the reticulo-endothelial system has been investigated, and so-called "Zymosan," which is a water-insoluble polysaccharide extracted from the cell-walls of yeast, has been reported as having such a function (refer to the Annals of the New York Scientific Institute, vol. 118, Art. 4, p. 233 (1964)). Also, the "Zymosan" has been reported and noticed to be effective for the prevention of arteriosclerosis of the system, the protection thereof against malignant tumor or the protection against infectious diseases, and the avoidance of radioactive diseases due to its function for stimulating the activity of the reticulo-endothelial system.

The unicellular green alga "Chlorella" contains the well known monosaccharides such as pentose, hexose and the like, and certain polysaccharides having complicated chemical compositions and structures. These polysaccharides have been considered not as the substance stored in the "Chlorella," but as the constituents of the cell-walls of the "Chlorella." And also, it has been considered that these polysaccharides are difficult to extract them from the cells due to the stiffness of the walls of cells.

The inventors have discovered an invention directed to a process for extracting a substance effective for stimulating the function of the reticulo-endothelial system from the unicellular green alga such as "Chlorella" by successively extracting the green alga with water, an alkaline aqueous solution and an acidic aqueous solution, removing impurities contained in each of the extracts by the action of lead acetate, forming a precipitate of an insoluble substance by adding ethyl alcohol to each of the concentrated extracts and recovering the precipitate from each of the concentrated extracts. As the results of the investigation, the inventors have found the fact that the substance chemically extracted contains polysaccharides containing nitrogen and also that this substance differs from any known polysaccharides. Further, in examining the physiological function of such substance, the inventors have found an important fact that the substance has the advantageous function for stimulating the activity of reticulo-endothelial system superior to that of the "Zymosan."

Therefore, the object of this invention is to provide an improved process for extracting a substance effective for stimulating the function of the reticulo-endothelial system from the unicellular green alga such as "Chlorella" by omitting the step for removing impurities by using lead acetate and the hydrogen sulfide gas. Thus, the process of this invention is simple and economical as compared with the invention mentioned above.

According to this invention the process is carried out by successively extracting the unicellular green alga with a hydrophilic organic solvent or a mixture of water and a hydrophilic organic solvent, water, an alkaline aqueous solution and an acidic aqueous solution under heating to produce a solvent-extract, a water-extract, an alkaline water-extract and an acidic water-extract; removing the hydrophilic organic solvent, the alkaline substance and the acidic substance from each of the extracts; adding a hydrophilic organic solvent to each of the extracts to form a precipitate; removing the precipitate from each of the extracts; adding ethyl alcohol to each of the resultant extracts to produce a white substance as the precipitate and recovering the white precipitate from each of the extracts.

In accordance with the method of this invention, the unicellular green alga such as "Chlorella" or "Scenedesmus" may be used in the powdered dry state or in the state of raw green alga containing a considerable amount of water. Examples of the hydrophilic organic solvent, which can be used in this invention, are methanol, ethanol, acetone and the like. Such a hydrophilic organic solvent may be mixed with the water-containing raw unicellular green alga so as to maintain the organic solvent concentration of about 80%. Alternatively, when the unicellular green alga is used in the dry state, the dry green alga may be mixed with the hydrophilic organic solvent having a concentration of about 80%. At any rate, the unicellular green alga is charged into an extractor provided with a reflux condenser and then it is extracted with the hydrophilic organic solvent under heating to produce a solvent-extract. The solvent-extract is concentrated under reduced pressure by removing the hydrophilic organic solvent to the syrupy state.

The solvent-extracted residual green alga is then extracted with water under heating in the form of a water-extract. The water-extract is concentrated under reduced pressure to the syrupy state. The water-extracted residual green alga is then extracted with an alkaline aqueous solution under heating to produce an alkaline water-extract.

The alkaline water-extract is removed an alkaline substance and then concentrated under reduced pressure to the syrupy state.

Further, the alkaline water-extracted residual green alga is extracted with an acidic aqueous solution under heating to produce an acidic water extract. The acidic water-extract is removed as acidic substance and then concentrated under reduced pressure to the syrupy state.

Each of the concentrated extracts as mentioned above is mixed with the hydrophilic organic solvent until the concentration of each of the mixtures reaches about 80% and impurities such as protein, organic acids, tannin and coloring matter are precipitated. The precipitate is removed from each of the mixtures by filtration and then each of the mixtures is again concentrated under reduced pressure by removing the hydrophilic organic solvent to the syrupy state. The syrup is poured into the absolute ethanol with agitation, and the white floccular precipitate comes out in the ethanol solution. The ethanol solution is left to stand overnight in a refrigerator to complete the precipitation and then the precipitate is separated and purified whereby the polysaccharide complex contained in the unicellular green alga is obtained. This polysaccharide is water soluble and can be stored as a water solution. The water solution of the white floccular precipitate is a clear pale brown solution. After the removal of the free saccharides from the water solution, the samples of the resultant solution are tested by the Molisch's reaction and recognized to be positive. This shows that the white precipitate is the polysaccharide. Also, the same samples are tested by the nitrogen-analysis and recognized that it contains a large amount of nitrogen. This shows that the nitrogen-containing polysaccharide complex is contained in the white precipitate.

It should be understood that the process of this invention can be applied to any unicellular green alga such as "Scenedesmus" and the substance thus obtained has the same pharmacological effects as the substance produced from the "Chlorella."

This invention is illustrated by the following example.

100 grams of a dry powder of the "Chlorella" were charged into an extractor provided with a reflux condenser and extracted with two liters of ethanol having an 80% concentration by heating the mixture at 80° C. on a water bath for about one hour while the mixture is agitated. The resultant mixture was cooled and filtered for obtaining a dark green opaque extract. The residual "Chlorella" was also extracted with two liters of ethanol having an 80% concentration in the same manner as described above for obtaining the second extract. Such an ethanol extraction procedure for the residual "Chlorella" was repeated for five times in the same manner as described above. The five extracts were collected in a bottle containing about ten liters of extract. The extract thus collected was distilled under reduced pressure to remove ethanol and the water-insoluble substances such as chlorophyll etc. were separated by filtration. If the filtrate thus obtained was deeply colored, it was decolorized with active carbon and then concentrated under reduced pressure to obtain about 30 ml. of syrupy liquid. The syrupy liquid thus obtained was poured into about three liters of absolute ethanol with agitation and the white floccular precipitate was obtained. The mixture of this precipitate and ethanol was placed in a refrigerator overnight and then ethanol was separated from the mixture by means of centrifugation. The precipitate was purified by washing it with ethanol for several times. The purified precipitate thus obtained is referred to as "Fraction-I."

The ethanol-extracted residual "Chlorella" was extracted with two liters of water under boiling for about five hours while the mixture was agitated. The mixture was cooled and filtered for obtaining a light brownish yellow, turbid extract. Such a water extraction procedure for the residual "Chlorella" was repeated until the extract becomes colorless and the total extract of about seven liters was obtained. This extract was concentrated under reduced pressure into about 100 ml., to which 400 ml. of absolute ethanol was added with agitation to produce a precipitate. The precipitate was separated from the extract by filtration and then the ethanol was removed from the extract under reduced pressure to produce about 30 ml. of syrupy liquid. The syrupy liquid thus obtained was poured into about three liters of absolute ethanol with agitation and the white floccular precipitate was obtained. The precipitate was treated in the same manner as described above to produce a purified precipitate. This purified precipitate is referred to as "Fraction II."

The water-extracted residual "Chlorella" was extracted with two liters of a 5% caustic soda solution by heating the "Chlorella" on a boiling water bath for about three hours while the mixture was agitated. The mixture was cooled and filtered for obtaining about two liters of a dark green, opaque extract. A 10% hydrochloric acid was added to the extract for adjusting its pH at 6.5 and producing a precipitate. The precipitate was filtered and the extract was concentrated under reduced pressure into about 100 ml. and then the concentrated extract was dialized overnight in the running water to remove the inorganic salts and further the extract was concentrated into about 50 ml. This concentrated extract was poured into about 200 ml. of absolute ethanol with agitation to precipitate the impurities such as protein and coloring matter and then the impurities were removed from the extract by filtration. The filtrate was distilled under reduced pressure to remove the ethanol and further concentrated into about 20 ml. of the syrupy liquid. This syrupy liquid was poured into about 2 liters of absolute ethanol with agitation and the white floccular precipitate was obtained. This precipitate was treated in the same manner as described above to produce a purified precipitate. The purified precipitate is referred to as "Fraction III."

Finally, the alkaline water-extracted residual "Chlorella" was extracted with one liter of a 5% sulfuric acid by heating the "Chlorella" on a boiling water bath for about three hours while the mixture was agitated. The mixture was cooled and filtered for obtaining about one liter of a yellowish brown color extract. To this extract was added calcium carbonate to produce calcium sulfate. The calcium sulfate was removed from the extract by filtration and then the extract was concentrated under reduced pressure into about 50 ml., to which 200 ml. of absolute ethanol was added with agitation to precipitate the impurities which were removed from the extract by filtration. The filtrate was distilled under reduced pressure to remove the ethanol and further concentrated into about 20 ml. of the syrupy liquid. This syrupy liquid was poured into about 2 liters of absolute ethanol with agitation and the white floccular precipitate was obtained. This precipitate was treated in the same manner as described above to produce a purified precipitate. The purified precipitate is referred to as "Fraction IV."

The "Fraction I," "Fraction II," "Fraction III" and "Fraction IV" were water soluble and each of them dissolved in water to make a solution. After removing the free saccharides from each solution, it was tested by the Molisch's reaction and the nitrogen analysis. The reaction was positive and also the solution was found to contain about 3% of nitrogen. Therefore, it was recognized that the purified precipitate consisted of a polysaccharide complex containing nitrogen. The total yield of "Fractions I to IV" was about 3%.

Further, the purified precipitate was tested, its function stimulating the activity of the reticulo-endothelial system. The test was conducted by using the Halpern's method which is well known by those skilled in the art and disclosed in the British Journal of Experimental Pathology, vol. 34, pp. 426 and 441 (1953).

According to this method, a test animal "Donryu-rat" received an Indian ink through the intravenous route, and after a certain period of time, the tested rat was bled and the amount of the carbon particles remaining in the blood specimen was measured. If the function of the rat for removing the carbon particles was increased, the Indian ink must be rapidly removed from the blood of the test rat and the amount of the carbon particles remaining in the specimen decreased.

Figure 2:
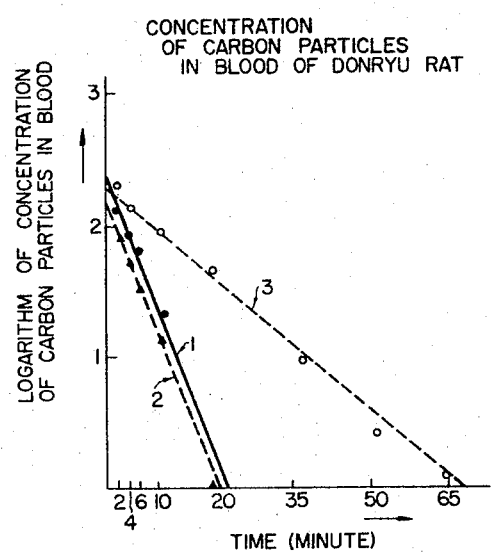

The test results are given in the accompanying FIGS. 1 and 2.

Referring to FIG. 1, it shows the granulopectic index of the test animal "Donryu-rat" which was tested by using a control sample, Zymosan A, Zymosan B, substance A and substance B. It should be noted that the substances A and B were the polysaccharides extracted by the method according to the examples. And also, it should be noted that Zymosan A and substance A were injected into the test rat in the amount of one milligram per 100 grams of body weight, and also that Zymosan B and substance B were injected into the test rat in an amount of ten milligrams per 100 grams of body weight. The sign "K" is the granulopectic index of the test rats and was calculated by the formula, Log. C′—Log. C/T, wherein C′ indicates the concentration of Indian ink in the blood (mg./100 ml.) at 10 minutes after the ink was injected, C indicates the concentration of Indian ink in the blood (mg./100 ml. ) at 20 minutes after the ink was injected, and T indicates 10 minutes. The mark "X" indicates the average value of K.

As obvious from the results as shown in FIG. 1, it is understood that the substances A and B extracted according to this invention give higher granulopectic index than those of the control samples, Zymosan A and Zymosan B. This fact shows that the substances A and B have the function stimulating the ability of the reticuloendothelial system superior to those of other samples tested.

Now, referring to FIG. 2, it shows the relationship between the concentration of carbon particles in blood of the test rat and the passage of time. Line 1 shows the changes in concentration of carbon particles in the blood of the tested rat injected with the extracted substance made according to this invention, line 2 shows the changes in concentration of carbon particles in the blood of the tested rat injected with Zymosan and line 3 shows the control rat which was not injected with any medicine. By comparing line 1 with line 2, it is obvious that the medical effect of the substance extracted according to this invention is substantially the same as that of Zymosan.

What we claim is:

1. A process of producing an active substance from an unicellular green alga such as "Chlorella" or "Scenedesmus" by successively extracting said green alga with a hydrophilic organic solvent or a mixture of the hydrophilic organic solvent and water, and water, an alkaline aqueous solution and an acidic aqueous solution at an elevated temperature to produce a solvent extract, a water extract, an alkaline water extract and an acidic water extract respectively, removing said hydrophilic organic solvent, an alkali substance or an acidic substance from each of said extracts, forming a precipitate of impurities by adding an organic solvent such as ethanol into each of said extracts, removing said impurities from each of said extracts, so as to maintain said organic solvent at the concentration of about 80%, forming a white precipitate by adding ethanol into each of said extracts respectively, and recovering said white precipitate from each of said extracts.

2. The process of producing an active substance as claimed in claim 1, wherein the unicellular green alga is extracted under boiling.

3. The process of producing an active substance as claimed in claim 1, wherein the white precipitate resulting from the solvent extract, the water extract, the alkaline water extract or the acidic water extract is purified respectively.

References Cited

UNITED STATES PATENTS

| | | | |
|---|---|---|---|
| 2,871,235 | 1/1959 | de Jilovice | 260—209 |
| 3,080,355 | 3/1963 | Müller | 260—209 |
| 3,316,241 | 4/1967 | Leder et al. | 260—209 |

LEWIS GOTTS, Primary Examiner

JOHNNIE R. BROWN, Assistant Examiner

U.S. Cl X.R.

260—211, 999; 424—95